United States Patent [19]

Papenhagen et al.

[11] Patent Number: 4,846,012
[45] Date of Patent: Jul. 11, 1989

[54] ACTUATING LINKAGE FOR A CLUTCH

[75] Inventors: Dieter Papenhagen, Waiblingen; Eberhard Klemm, Ostfildern; Aurel Steilner, Kernen, all of Fed. Rep. of Germany

[73] Assignee: Daimler-Benz Aktiengesellschaft, Stuttgart, Fed. Rep. of Germany

[21] Appl. No.: 113,660

[22] Filed: Oct. 28, 1987

[30] Foreign Application Priority Data

Oct. 29, 1986 [DE] Fed. Rep. of Germany ....... 3636748

[51] Int. Cl.⁴ .............................................. G05G 1/14
[52] U.S. Cl. ...................................... 74/512; 74/519; 192/111 A; 192/33 S; 188/136 BA
[58] Field of Search ................. 74/512, 513, 514, 519; 192/111 A, 70.25, 70.29, 70.3, 30 V, 99 S; 188/196 BA

[56] References Cited

U.S. PATENT DOCUMENTS

| | | | |
|---|---|---|---|
| 3,443,450 | 5/1969 | Fender | 74/512 X |
| 3,587,342 | 6/1971 | Yamazaki | 74/540 |
| 3,621,959 | 11/1971 | Gale | 192/111 A |
| 4,263,999 | 4/1981 | Fasano | 192/111 A |
| 4,281,753 | 8/1981 | Takemoto et al. | 192/99 S |
| 4,304,322 | 12/1981 | Beccaris | 192/111 A |
| 4,319,497 | 3/1982 | Shinto et al. | 74/512 |
| 4,326,616 | 4/1982 | Mochida et al. | 192/111 A |
| 4,381,053 | 4/1983 | Hyodo | 192/99 S X |
| 4,624,152 | 11/1986 | Stotz et al. | 192/99 S X |

FOREIGN PATENT DOCUMENTS 1020531 12/1957 Fed. Rep. of Germany ........ 74/519
2923027 2/1985 Fed. Rep. of Germany .
3636748 5/1987 Fed. Rep. of Germany .

Primary Examiner—Vinh Luong
Attorney, Agent, or Firm—Barnes & Thornburg

[57] ABSTRACT

An actuating linkage for a motor vehicle clutch with a clutch lever which can assume two end positions corresponding to the engaged and the disengaged clutch and at which engages an over-dead-center spring that exerts on the clutch lever a force directed toward a respective end position. In order to reduce the actuating force to be produced by the driver with a strong over-dead-center-point spring, the compensating spring engages at the clutch lever which exerts on the clutch lever a force directed toward the end position corresponding to the disengaged clutch whereby the torque applied on the clutch lever by the compensating spring is smaller with a disengaged clutch than with an engaged clutch.

2 Claims, 2 Drawing Sheets

ACTUATING LINKAGE FOR A CLUTCH

BACKGROUND AND SUMMARY OF THE INVENTION

The present invention relates to an actuating linkage for a clutch, especially for a motor vehicle clutch with a clutch lever that has two end positions corresponding to the engaged and the disengaged clutch and at which an over-dead-center position spring engages which exerts a force directed toward the respective end position.

In such actuating linkages as are disclosed, for example, in the DE-OS No. 29 23 027, the over-dead-center spring must have a high spring force when high abutment forces are used in the clutch, in order to maintain within acceptable limits the actuating force to be exerted on the clutch lever within the range of the end position corresponding to the disengaged clutch. However, an increase of the actuating force in the range of the other end position results therefrom which has as a consequence a comfort deterioration.

The present invention is concerned with the task to so construct an actuating linkage of the aforementioned type that a low actuating force which does not impair the comfort is achieved over the entire clutch lever travel with high abutment forces in the clutch.

The underlying problems are solved according to the present invention in that a compensating spring engages at the clutch lever which exerts on the clutch lever a force directed toward the end position corresponding to the disengaged clutch whereby the torque applied by the compensating spring on the clutch lever in the range adjacent the end position that corresponds to the disengaged clutch, is smaller as a result of a smaller spring force and/or a smaller effective lever arm than in the range adjacent the end position that corresponds to the engaged clutch.

In the actuating linkage constructed according to the present invention, the compensating spring assists in the range between the end position corresponding to the engaged clutch and the dead-center position of the dead-center spring, the actuating force opposite to the force of the dead-center spring so that the required actuating force is considerably reduced in this range and therewith the actuating comfort is improved. During a further actuation of the clutch lever beyond the dead-center position, the influence of the compensating spring is considerably smaller so that a return of the actuating linkage from the disengaged condition of the clutch is not impaired by return forces that are additively too small.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
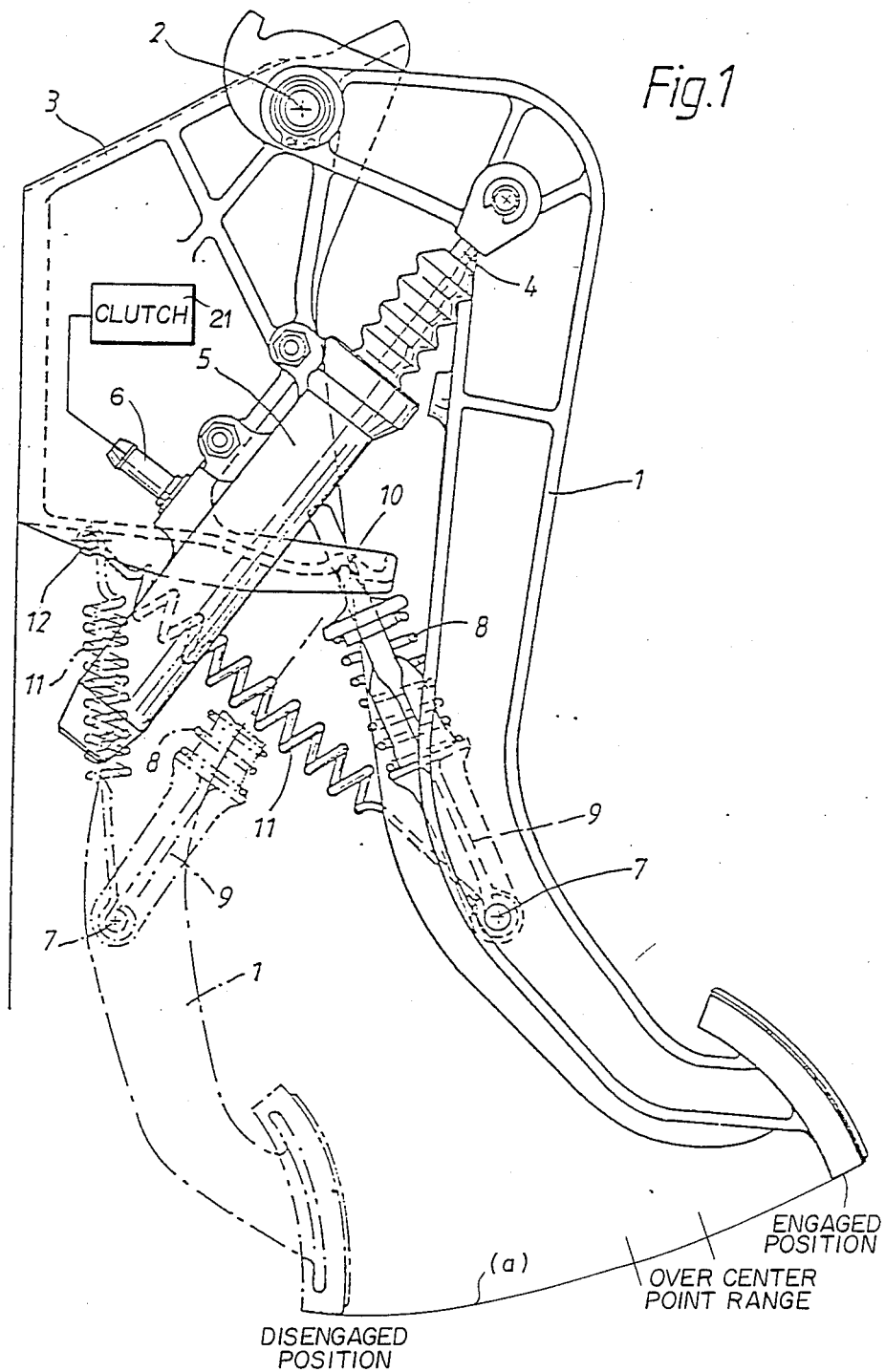
FIG. 1 is a side elevational view of an actuating linkage in accordance with the present invention.

Referring now to the drawing, and more particularly to FIG. 1, a clutch lever 1 is rotatably supported in a lever bearing 2 at a body part 3 of a motor vehicle (not shown). The clutch lever 1 is thereby illustrated in the end position corresponding to the engaged clutch in full lines and in the other end position corresponding to the disengaged clutch in dot-and-dash lines. A piston cooperating with a hydraulic cylinder 5 is pivotally connected at the clutch lever 1 by way of a piston rod 4; a hydraulic pressure is reduced by the piston rod in dependence on the actuating force applied on the clutch lever 1, whereby hydraulic pressure is adapted to be transmitted to the clutch 20 by way of a hydraulic line 21 adapted to be connected with the hydraulic cylinder 5 by way of the connecting nipple 6.

A compression spring constructed as over-dead-center spring 8 is pivotally connected at the clutch lever 1 in the point of pivotal connection 7 by way of a pivotal connecting member 9; the compression spring 8 is supported on the other side at the vehicle body part 3 in a support bearing 10. The point of pivotal connection 7 and the support bearing 10 are so located in relation to the lever arm bearing 2 that the over-dead-center-point spring 8 assumes a dead-center position at approximately one-third or one-fourth of the clutch lever travel, starting from the end position corresponding to the engaged clutch as it travels along arc (a) toward the disengaged position, and in the other positions of the clutch lever exerts on the same a force directed toward the adjacent end position.

A compensating spring 11 constructed as drawspring is additionally pivotally connected at the point of pivotal connection 7 which at the other end, is also pivotally connected at the body part 3 at a point of pivotal connection 12. The two pivot points 7 and 12 are so arranged with respect to one another and in relation to the lever bearing 2 that in each position of the clutch lever 1 the compensating spring 11 exerts on the clutch lever a draw force in the direction of the end position corresponding to the disengaged clutch. The moment exerted by this draw force on the clutch lever 1 in relation to the lever bearing 2 becomes continuously smaller with a clutch lever movement in the direction toward the end position corresponding to the disengaged clutch because both the draw force of the compensating spring 11 becomes smaller by reason of a mutual approach of the two points pivotal connection 7 and 12 which take place during this movement, as also the effective lever arm of the compensating spring 11 becomes smaller as a result of an approach of the line of action of the compensating spring 11 which is determined by the two points of pivotal connection 7 and 12, to the lever bearing 2.

Figure 2:
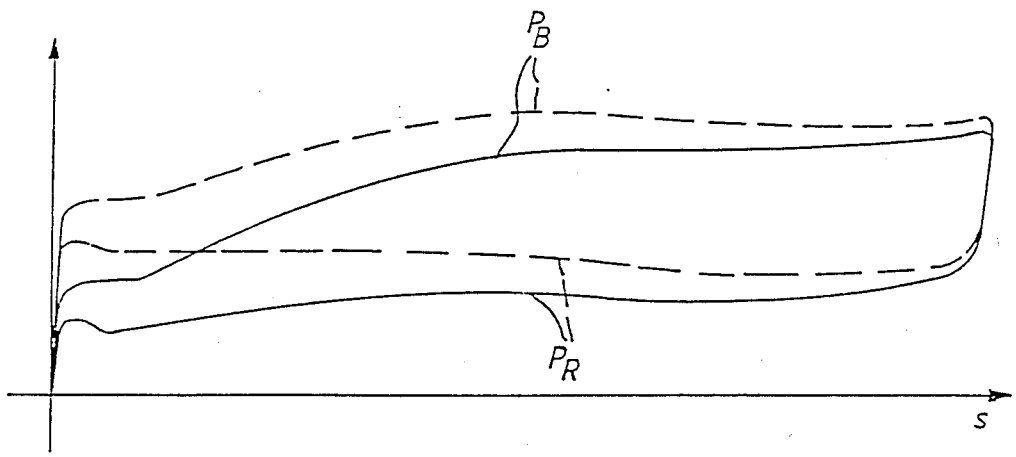
FIG. 2 is a force-travel-diagram for the clutch lever of the present invention.

The force P necessary for the actuation of the clutch lever 1 is plotted in the diagram of FIG. 2 over the travel s of the clutch lever 1 whereby the starting position of the travel s is the end position corresponding to the engaged clutch. The full lines represent the forces P in the actuating linkage constructed according to the present invention and the dash lines represent the actuating forces in a similar actuating linkage, however, without the compensating spring. The upper line thereby represents in each case the actuating force $P_B$ to be applied by the driver of the motor vehicle during the disengagement of the clutch and the respective lower line represents the return force $P_R$ which is available during the engagement of the clutch for the return of the actuating linkage. The difference between these two forces $P_B$ and $P_R$ which becomes greater with the travel s, corresponds to the increasing friction forces which depend on the forces inside of the clutch linkage and the clutch which become larger with an increasing travel s.

In the actuating linkage without compensating spring 11, relatively high forces $P_B$ have to be applied by the driver immediately at the beginning of the disengaging operation which are recognized as annoying by the driver and represent a comfort loss. This initial force is quite considerably reduced by the arrangement of the compensating spring 11 according to the present invention which is sensed by the driver as agreeable.

The forces $P_B$ to be applied by the driver are also decreased over the entire further travel s by the compensating spring 11. The two lines $P_B$ thereby approach one another ever more with increasing travel s, conditioned by the torque applied by the compensating spring 11 on the clutch lever 1 which becomes smaller. It is assured thereby that the remaining return force $P_R$ does not fall below a value necessary for the return of the actuating linkage, especially with a large travel s. Thus, the forces to be applied by the driver can be considerably decreased without other disadvantages by the arrangement of the compensating spring 11 according to the present invention.

While we have shown and described only one embodiment in accordance with the present invention, it is understood that the same is not limited thereto, but is susceptible of numerous changes and modifications as known to those skilled in the art, and we therefore do not wish to be limited to the details shown and described herein but intend to cover all such changes and modifications as are encompassed by the scope of the appended claims.

We claim:

1. An actuating linkage for a clutch, comprising a clutch, a clutch lever means mounted on a body part operable to engage and disengage said clutch having two end positions, one end position corresponding to an engaged clutch lever position and the other end position corresponding to a disengaged clutch lever position, spring means having an over-dead-center point engaging at the clutch lever, said spring means exerting in a position of the clutch lever between the over-dead-center point and an end position a force directed toward this end position, and a compensating spring means mounted on a said body part and engaging at the clutch lever which exerts on the clutch lever a force directed to the end position corresponding to the disengaged clutch lever position, and the torque applied by the compensating spring means on the clutch lever in the range adjacent the end position corresponding to the disengaged clutch lever position being smaller as a result of at least one of a smaller spring force and a smaller effective lever arm than in the range adjacent the end position which corresponds to the engaged clutch lever position.

2. An actuating linkage for a clutch according to claim 1, wherein the clutch is a motor vehicle clutch.

* * * * *